United States Patent
Holcomb et al.

(10) Patent No.: US 8,847,100 B2
(45) Date of Patent: Sep. 30, 2014

(54) WELD CAP AND TIP INSPECTION METHOD AND APPARATUS

(75) Inventors: Timothy J. Holcomb, Lake Orion, MI (US); Scott M. Dreslinski, Rochester Hills, MI (US)

(73) Assignee: Fanuc America Corporation, Rochester Hills, MI (US)

( * ) Notice: Subject to any disclaimer, the term of this patent is extended or adjusted under 35 U.S.C. 154(b) by 1310 days.

(21) Appl. No.: 11/970,898

(22) Filed: Jan. 8, 2008

(65) Prior Publication Data

US 2009/0173725 A1 Jul. 9, 2009

(51) Int. Cl.
G01B 11/30 (2006.01)
B23K 11/30 (2006.01)
B23K 11/31 (2006.01)
B23K 11/25 (2006.01)

(52) U.S. Cl.
CPC .......... *B23K 11/252* (2013.01); *B23K 11/3072* (2013.01); *B23K 11/314* (2013.01); *B23K 11/3063* (2013.01)
USPC .......................................... 219/109; 382/152

(58) Field of Classification Search
USPC .............. 219/109, 110, 130.01; 382/152, 313
See application file for complete search history.

(56) References Cited

U.S. PATENT DOCUMENTS

| | | | |
|---|---|---|---|
| 4,104,724 A | 8/1978 | Dix et al. | |
| 4,115,684 A | 9/1978 | Lindbom | |
| 4,343,980 A | 8/1982 | Stanya et al. | |
| 4,610,153 A | 9/1986 | Nedorezov | |
| 4,711,984 A | 12/1987 | Bilge et al. | |
| 4,733,050 A | 3/1988 | Grafius | |
| 4,885,451 A | 12/1989 | Farrow et al. | |
| 5,013,887 A | 5/1991 | Gold | |
| 5,083,003 A | 1/1992 | Clark, Jr. et al. | |
| 5,386,096 A | 1/1995 | Buda et al. | |
| 5,449,877 A | 9/1995 | Buda et al. | |
| 5,675,229 A | 10/1997 | Thorne | |
| 6,018,729 A | 1/2000 | Zacharia et al. | |
| 6,124,693 A * | 9/2000 | Okanda et al. | 318/568.11 |
| 6,184,487 B1 | 2/2001 | Visscher | |
| 6,204,469 B1 * | 3/2001 | Fields et al. | 219/121.6 |
| 6,639,181 B2 | 10/2003 | Suzuki et al. | |
| 6,696,660 B2 | 2/2004 | Nastasi, Jr. | |
| 6,750,418 B1 | 6/2004 | Nastasi, Jr. | |
| 7,132,617 B2 | 11/2006 | Lee et al. | |

(Continued)

FOREIGN PATENT DOCUMENTS

| | | | |
|---|---|---|---|
| JP | 01192486 A | * | 8/1989 |
| JP | 08271236 A | * | 10/1996 |
| WO | WO 00/71291 | | 11/2000 |

OTHER PUBLICATIONS

TCP-Calibration Unit, www.robot-welding.com/tcp.htm, Nov. 12, 2001 (p. 1 of 1).

*Primary Examiner* — Brian Jennison
(74) *Attorney, Agent, or Firm* — Fraser Clemens Martin & Miller LLC; William J. Clemens (57) ABSTRACT

A robot welding apparatus including a welding station having a welding robot with weld tips for creating a weld along a work piece. A welding power supply and control pendant is also provided. A visual screen of the control pendant provides a view of the weld tips for use with the method to detect characteristics such as weld tip face measurement, tip wear measurement, tip alignment measurement, and cap replacement and type verification.

25 Claims, 11 Drawing Sheets

(56) References Cited

U.S. PATENT DOCUMENTS

| | | | |
|---|---|---|---|
| 2001/0008231 A1* | 7/2001 | Britnell | 219/121.63 |
| 2004/0112874 A1* | 6/2004 | Nastasi, Jr. | 219/109 |
| 2005/0077855 A1* | 4/2005 | Hochhalter et al. | 318/567 |
| 2006/0187454 A1* | 8/2006 | Shih et al. | 356/400 |
| 2006/0255097 A1* | 11/2006 | Walther | 228/101 |
| 2007/0038400 A1 | 2/2007 | Lee et al. | |
| 2007/0075048 A1* | 4/2007 | Kunisaki et al. | 219/91.1 |
| 2007/0131655 A1* | 6/2007 | Spinella et al. | 219/61.4 |
| 2007/0179001 A1* | 8/2007 | Sass et al. | 474/109 |
| 2008/0237303 A1* | 10/2008 | Lin et al. | 228/103 |

* cited by examiner

WELD CAP AND TIP INSPECTION METHOD AND APPARATUS

FIELD OF THE INVENTION

The present invention relates generally to a method and apparatus for assessing the characteristics of a weld cap and tip during robotic welding.

BACKGROUND OF THE INVENTION

Industrial robots are in widespread use for automated welding. The most prominent advantages of automated welding are precision and productivity. Robot welding improves weld repeatability. Once programmed correctly, robots will give precisely the same welds every time on workpieces of the same dimensions and specifications.

Automating the torch motions decreases the error potential which means decreased scrap and rework. With robot welding you can also get an increased output. Not only does a robot work faster, the fact that a fully equipped and optimized robot cell can run for 24 hours a day, 365 days a year without breaks makes it more efficient than a manual weld cell.

Another benefit of automated welding is the reduced labor costs. Robotic welding also reduces risk by moving the human welder/operator away from hazardous fumes and molten metal close to the welding arc.

The function of the welding electrodes is to conduct the current and to withstand the high pressures in order to maintain a uniform contact area and to ensure the continued proper relationship between selected current and pressure. Uniform contacting areas should therefore be maintained.

Good weld quality is essential and depends, to a considerable degree, upon uniformity of the electrode contact surface. This surface tends to be deformed (mushroomed) with each weld. Primary causes for mushrooming are too soft electrode material, too high welding pressure, too small electrode contact surface, and most importantly, too high welding current. These conditions cause excessive heat build-up and softening of electrode tips. Welding of today's coated materials also tends to contaminate the face of the electrodes.

As the electrode deforms (the tip flattens), the weld control is called upon to "step" up the welding current in order to compensate for "mushroomed" weld tips. Eventually, the production line will have to be shut down in order to replace the electrodes or to manually go in and hand dress the electrodes. This process will improve the weld cycle but in either case, the line is stopped and time is lost. Furthermore the deformed electrodes have caused unnecessary high consumption of energy and electrode material. Bad welds are caused by bad part fit-up, part quality control, weld face control and weld tip position.

In automatic tip dressing, a tip dresser is mounted on the line where it can be accessed by the welding robot. The robot is programmed to dress the electrodes at regular time intervals. The dressing can be done after each working cycle, after every second cycle, and so on. It depends upon how many spot-welds are done in each cycle. Maintaining proper electrode geometry minimizes production downtime and utility costs and increases weld efficiency.

Weld current steppers such as those described in U.S. Pat. Nos. 4,104,724; 4,885,451; 5,083,003; 5,386,096 and 5,449,877 provide an inadequate solution to the weld tip problem. A weld current stepper is a feature of the welding control wherein the welding current is increased (or, in special cases decreased) to compensate for welding electrode wear and deterioration. One way to implement a weld current stepper is to have the control keep track of the number of welds made and increase (or in some special cases, decrease) the welding current according to the number of welds made. Another method of implementing a weld current stepper is to use electrical measurements to identify events during the welding process and increase or decrease the welding current in response to these events. These methods of counting welds have been found to be inadequate to compensate for the variations in both the current and force required for an optimum weld due to the increasing contact area of the electrodes on the surface of the part and the wearing down of the electrode.

Controls have been placed on weld stoppers to simplify the system, however, these welding heat steppers require inputting the total number of welds to be made before dressing the electrodes and the heat percent increase over the original setting to be reached during the last weld. As such, no subjective assessment of the actual working robot weld tip is made.

U.S. Pat. No. 6,639,181 teaches an apparatus and method for assessing electrode tip wear. Tip replacement is determined by a replacement index average assigned based on welding voltage and current measurements. A comparison is made between the assigned value and a reference value.

WO 2000/071291 offers a different solution by providing a method for determining the resistance spot welding system condition having a servomotor-actuated welding machine to measure and control welding electrode force and position allow the welding controller to gain information that is useful to control the resistance spot welding process.

It is desirable to provide an accurate, real time subjective assessment of the weld tip during welding operation to ensure precision and productivity.

SUMMARY OF THE INVENTION

The present invention provides an apparatus and method, specifically machine vision, to detect characteristics such as weld tip face measurement, tip wear measurement, tip alignment measurement, and cap replacement and type verification.

The preferred embodiment is an apparatus for assessing the state of a weld cap comprising a welding robot including at least one weld cap; and a control pendant having a visual screen for viewing said at least one weld cap and including a control system having a processor and data storage for performing an assessment of the status of said at least one weld cap as compared with data stored in said data storage.

The assessed status of a weld cap is provided from the group of: weld cap tip face measurement, weld cap tip wear measurement, weld cap tip alignment measurement, verification of weld cap replaced and verification of weld cap type.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

Figure 1:
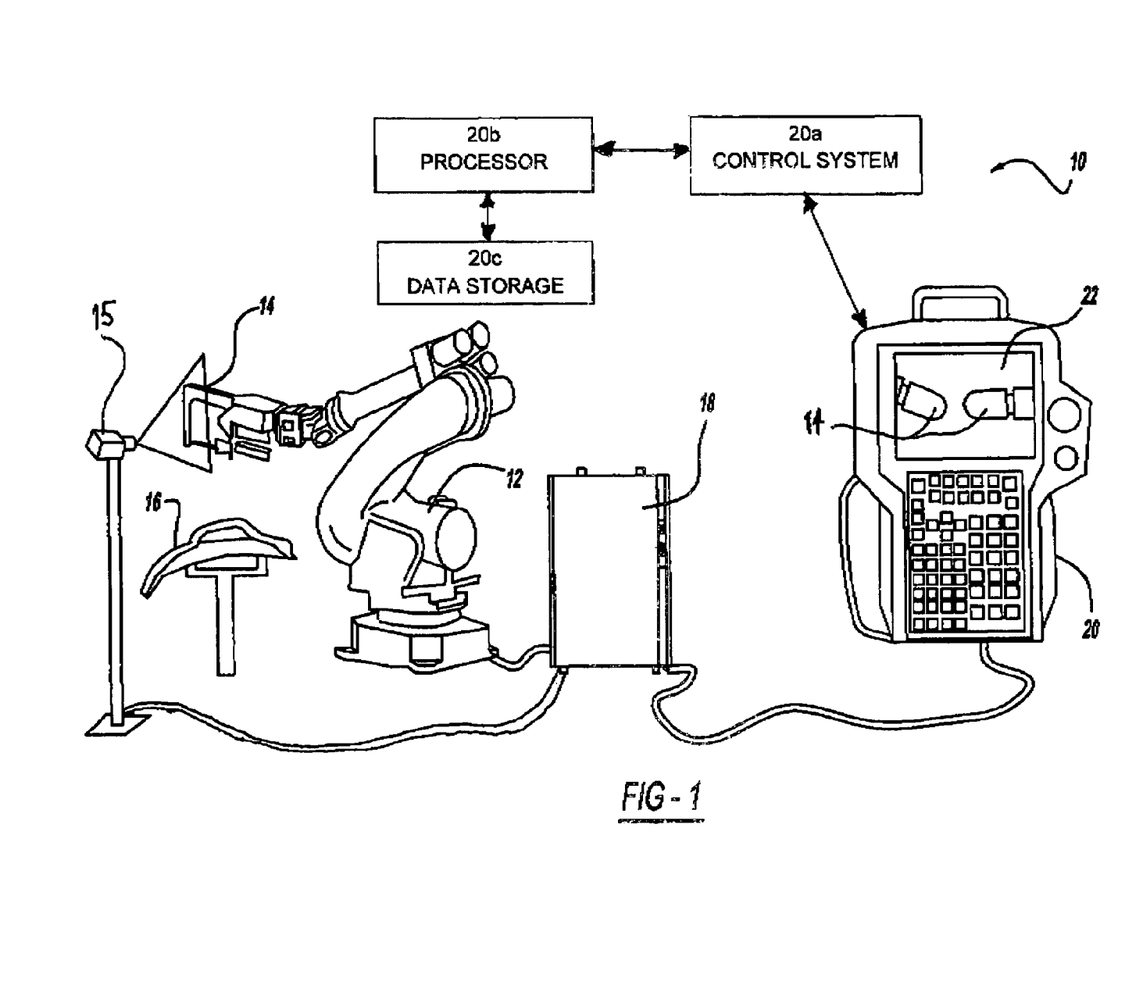
FIG. 1 illustrates a preferred apparatus of the present invention.

With reference to FIG. 1, there is shown a robot weld apparatus including a welding station 10 having a welding robot 12 with weld tips 14 for creating a weld along a work piece 16. A welding power supply 18 and control pendant 20 are provided also. A visual screen 22 of the control pendant of the present invention provides a view of the weld tips 14 for use with the method described below. A machine vision sensor 15 generates image data of the weld tips 14 to the control pendant 20. Control pendant 20 includes a control system 20a having a processor 20b and data storage 20c where the processor 20b comprises a suitable general purpose or specialized data processing device including hardware operable to execute stored computer software. The control system 20a is operable to perform the methods of the present invention.

The weld cap and tip inspection assessment method of the present Invention provides tip face measurement, tip wear measurement, tip alignment measurement, verification of cap replaced and verification of cap type.

Figure 2:
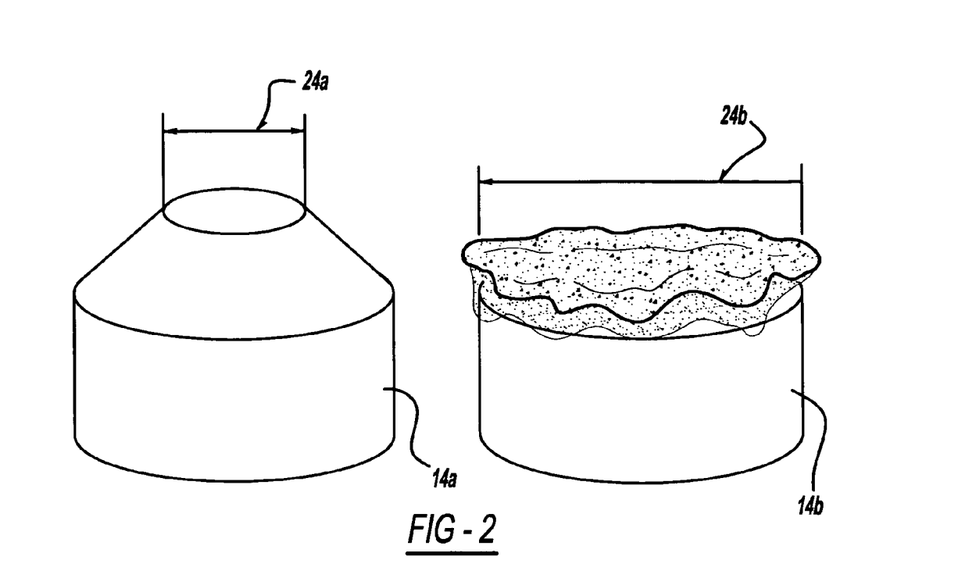
FIG. 2 illustrates a first comparison threshold measurement of a weld cap tip of the present invention.

FIG. 2 illustrates a weld tip 14a before use and weld tip 14b after use. The tip face measurement method of the present invention measures the weld tip face diameter 24a and 24b.

FIGS. 3 a-k are illustrative examples of measurements made to opposing caps 14 for determining the definable thresholds used in the methods of the present invention. These measurements include tip face, tip wear, tip alignment, and cap types for verification of standard cap measurements for any type cap provided at the weld tip.

Tip Face Measurement—Controlling the tip face is a variable in making good welds. Two current methods to work the tip face growth is the tip dressing and weld steppers described above. More particularly, the tip dressing cuts caps back to their original shape. The caps are dressed after so many welds, not by the size of the tip face. Dressers are high maintenance and may not properly cut. Cutters are consumable and therefore, expensive. The wrong cutters can be installed. Weld steppers are used to adjust the current to compensate for the worn weld tip. Weld current is directly affected by the weld area which changes over time. Adjusted current can create physically large welds. Tip inspection is done manually by an operator. Knowledge of tip face diameter can be used to help the weld controller correctly adjust the weld current to compensate or verify when tips have been or indicate when tips need to be dressed.

Figures 3A, 3B:
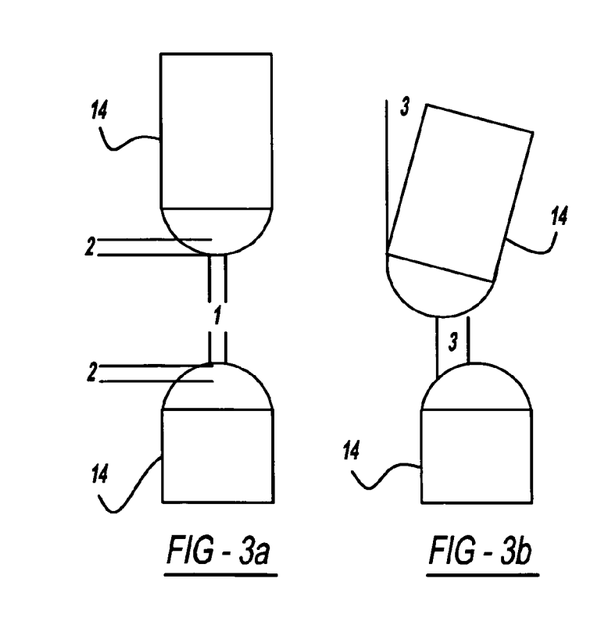
FIGS. 3a-k illustrate additional comparison threshold measurements of a weld cap tip of the present invention.
Figure 3C:
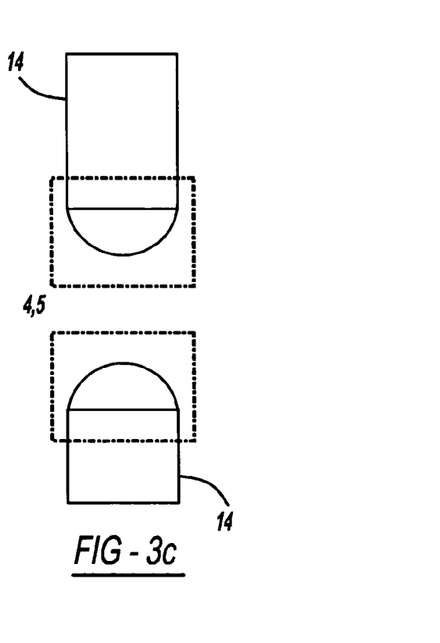
Figure 3D:
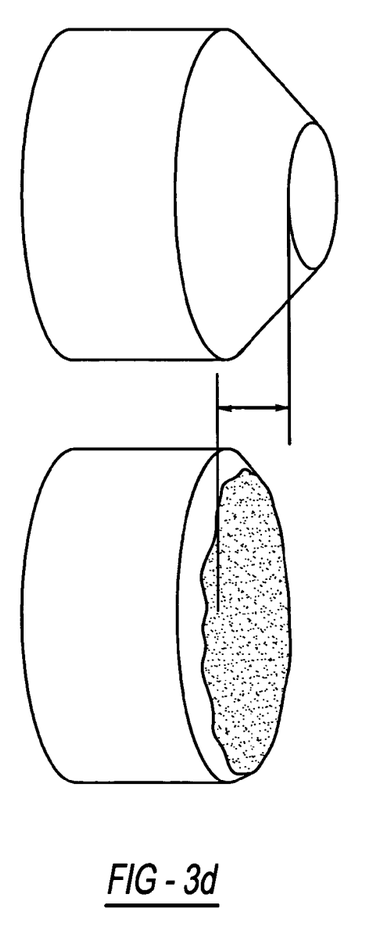
Figure 3E:
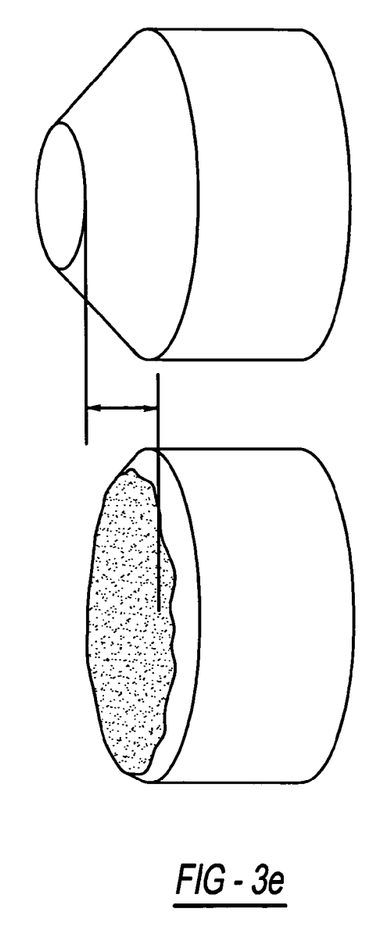
Figure 3F:
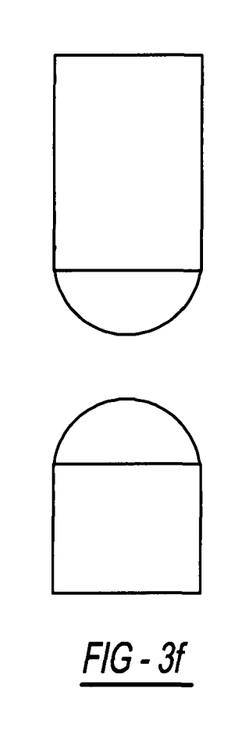
Figure 3G:
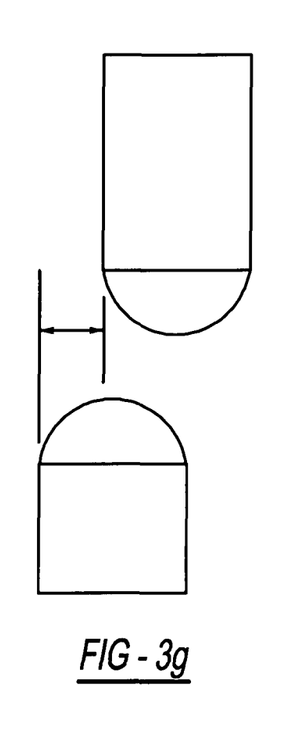
Figure 3H:
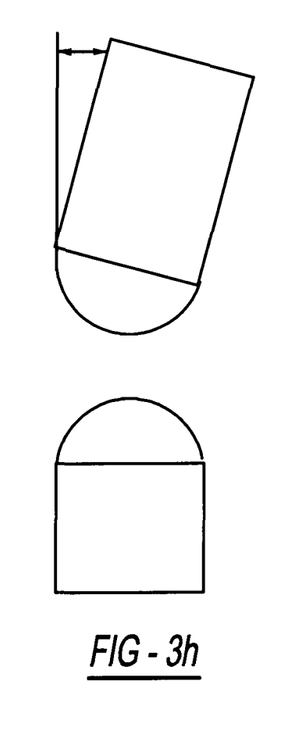
Figure 4:
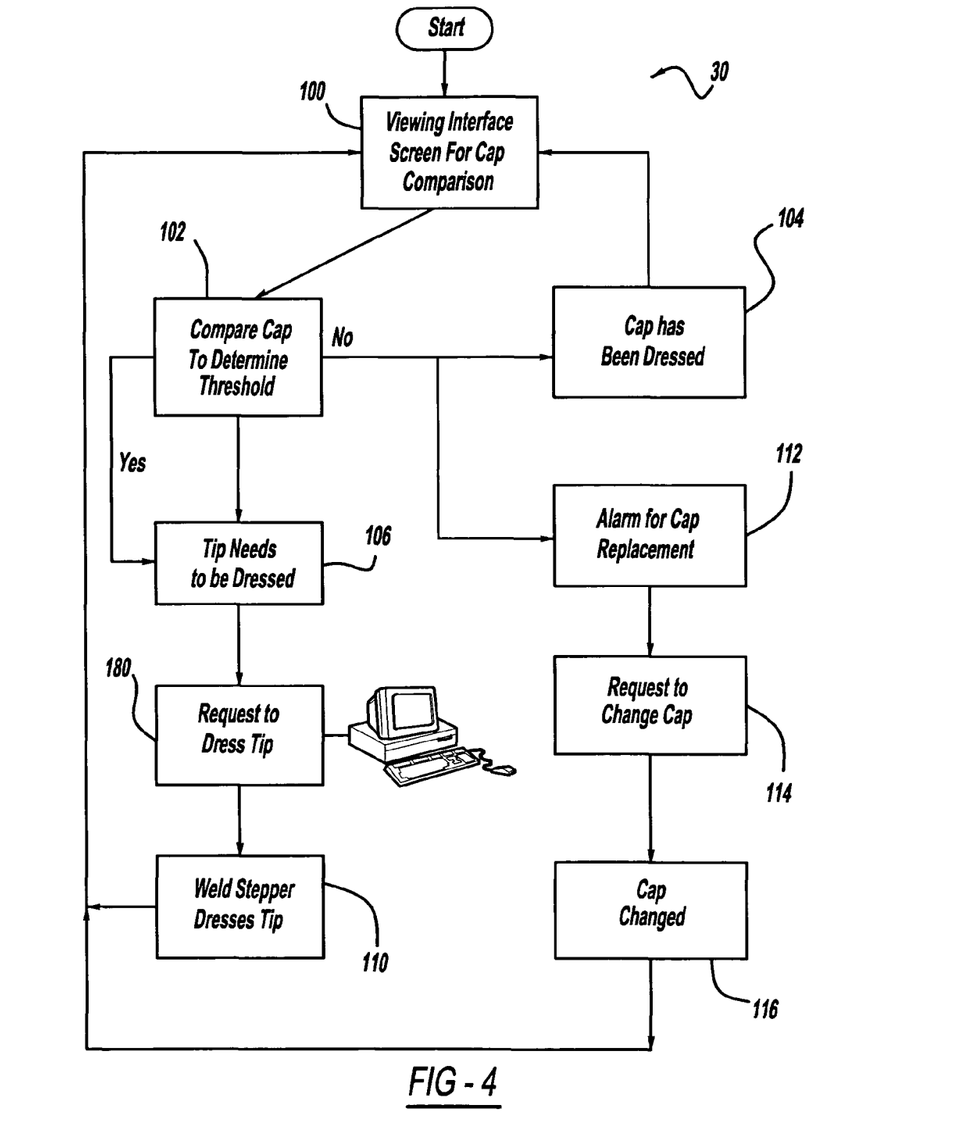
FIG. 4 is a flow chart of a first preferred method for face tip measurement of the weld cap tip of the present invention.

FIG. 4 is a flow chart diagram illustrating an exemplary method of operation of the weld tip face measuring process 30. FIGS. 3a and 3c are illustrative of some of the tip measurements used to determine threshold measurements for comparison during this process. The method begins at step 100 where the control pendant 20 provides a visual interface screen 22 and a programmed definable threshold for comparing "good" cap versus current cap to determine status of the current cap. At step 102, the system determines if the current cap needs to be dressed by comparing the "good" cap with a definable threshold for tip dressing to the current cap provided on the interface screen 22. Alternatively, at step 104, the comparison verifies that the current cap has been dressed. At step 106, if the cap needs to be dressed, at step 108 the control pendent 20 interfaces with a PC and generates a request to dress the tip of the current cap. A weld controller stepper is interfaced with the PC to dress the current cap tip 110. At step 102, the system compares the current cap measurements (FIG. 3a-e) to a definable threshold for cap replacement. If the cap does not reach the definable threshold, then to step 106, the cap is dressed. If the cap does reach the definable threshold, an alarm is set in step 112 and a request to replace the cap is in step 114.

Figure 5:
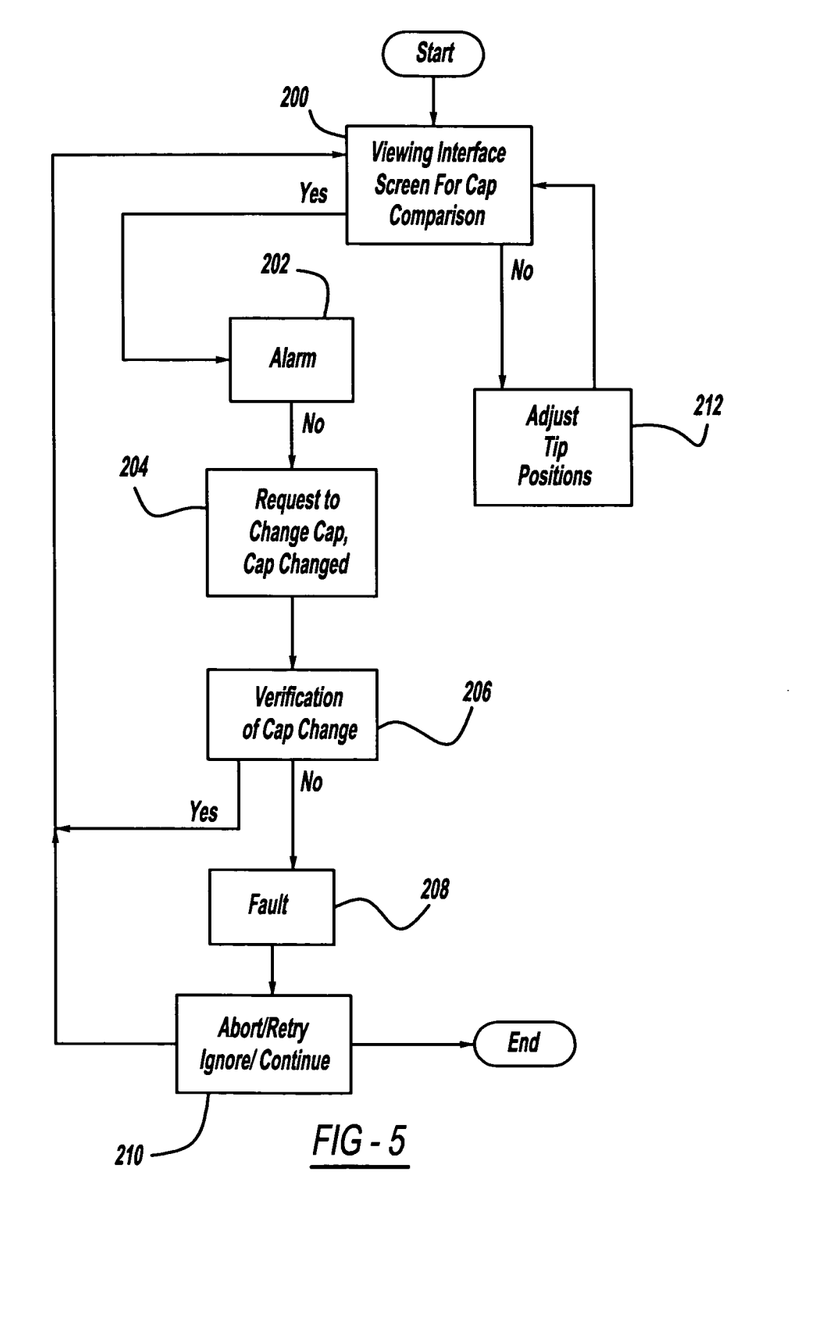
FIG. 5 is a flow chart of a second preferred method for tip wear measurement of the weld cap tip of the present invention.

Tip Wear Measurement—FIGS. 3d and 3e are illustrative of some of the tip wear measurements used to determine threshold measurements for comparison during this process. FIG. 5 is a flow chart diagram illustrating an exemplary method of operation of the tip wear measurement that provides for realignment of the weld tips when caps are newly replaced or worn. Tip position adjustment is preferably performed by a servo gun, but other means made be used. As in the Tip Face Measurement process, the threshold measurement comparison of the tip alignment may indicate that the cap 14 needs to be changed or verify that the cap 14 has been changed. At step 200, the visual interface screen 22 provides an image of the current cap with a graph, or any other form of visual measurement, for comparing the threshold measurements to the current tip. At step 202, if the comparison indicates that a threshold has been reached, a WARN or FAULT alarm is set off. At step 204, a request to change the cap is made and the cap is changed. At step 206, verification is made that the cap has been changed. At step 208, if verification is NOT made a FAULT command issues. At step 210, a choice can be made to Abort/Retry Cap Change/Ignore and Continue cap change. As with all methods, the user's choice is posted and logged. Alternatively, at step 202, if the threshold is not reached, step 212 provides a request to the interfaced servo gun to adjust the tip positions within allowable threshold range.

Figure 6:
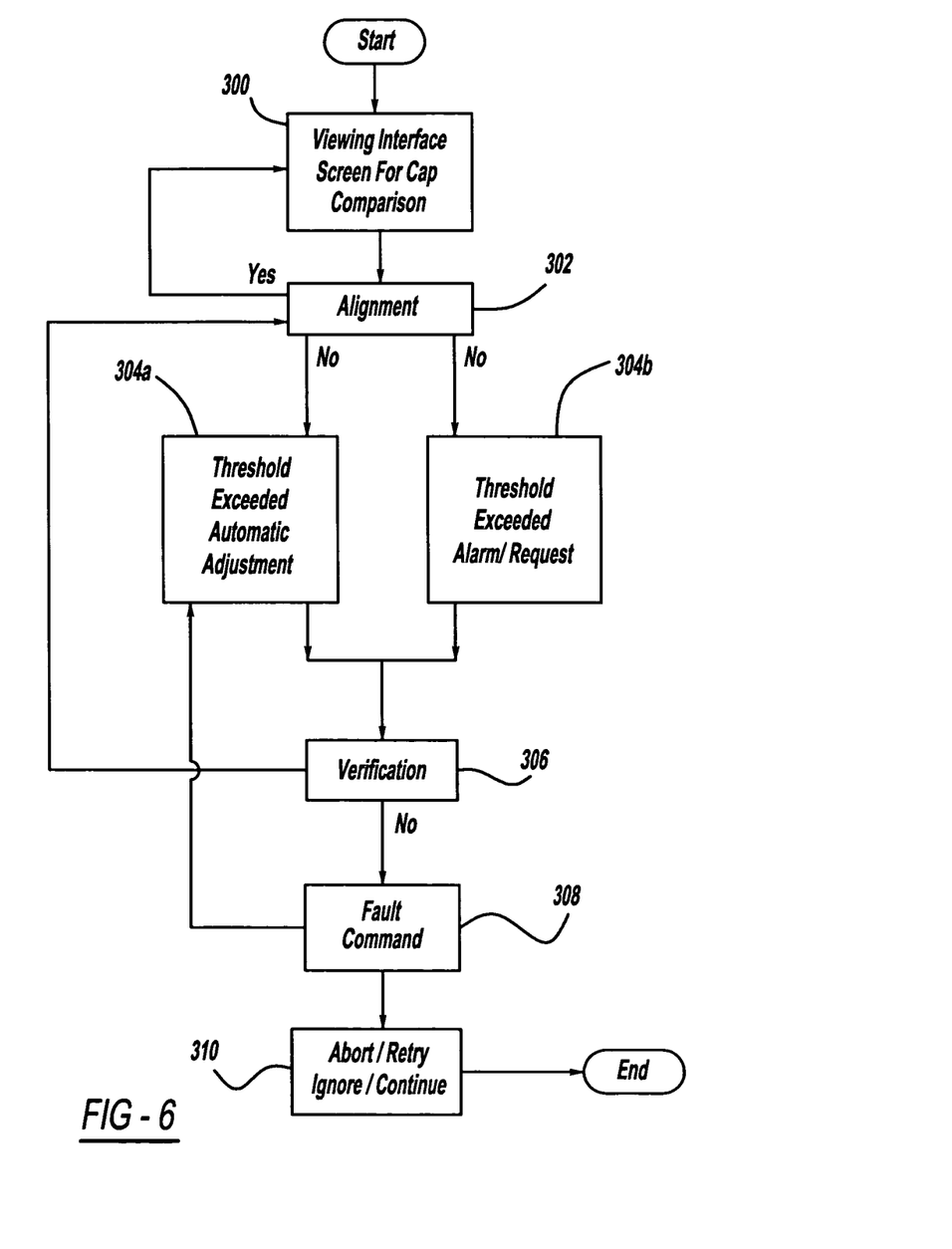
FIG. 6 is a flow chart of a third preferred method for tip alignment measurement of the weld cap tip of the present invention.

Tip Alignment Measurement—FIGS. 3b, and 3f-3h are illustrative of some of the tip wear measurements used to determine threshold measurements for comparison during this process. These threshold measurements are mapped with various preferred weld gun configurations and preferred weld cap and tip configurations and stored. FIG. 6 is a flow chart diagram illustrating an exemplary method of operation of the tip alignment measurement that may be used in combination with the processes above. Tip position adjustment is preferably performed by a servo gun, but other means made be used. At step 300, the visual interface screen 22 provides an image of the current caps for comparing the threshold measurements to the definable threshold of cap alignment. At step 302, if the comparison indicates alignment, then back to step 300. If the threshold is exceeded, at step 304a, automatic TCP adjustment is made or alternatively at step 304b, as above, a WARN or FAULT alarm is set off and a request is made to adjust the alignment. At step 306, verification is made that the caps have been realigned. At step 308, if alignment is NOT made, FAULT command issues. At step 310, a choice can be made to Abort/Retry Cap alignment/Ignore and Continue cap alignment. As with all methods, the user's choice is posted and logged.

Figure 3I:
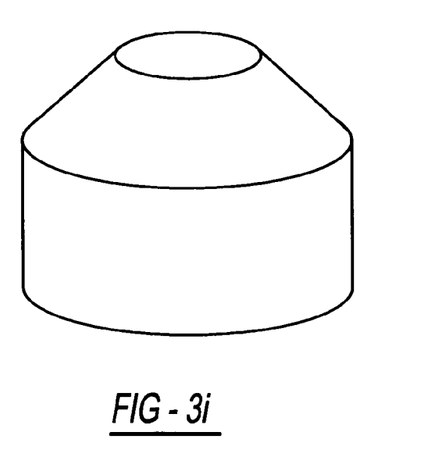
Figure 3J:
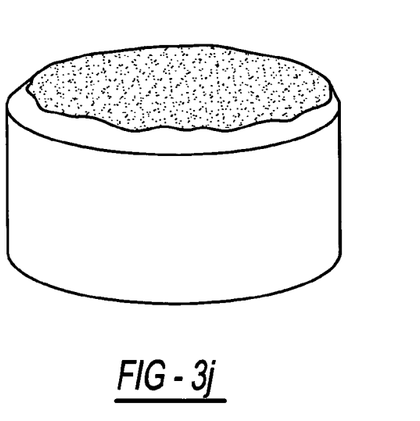
Figure 7:
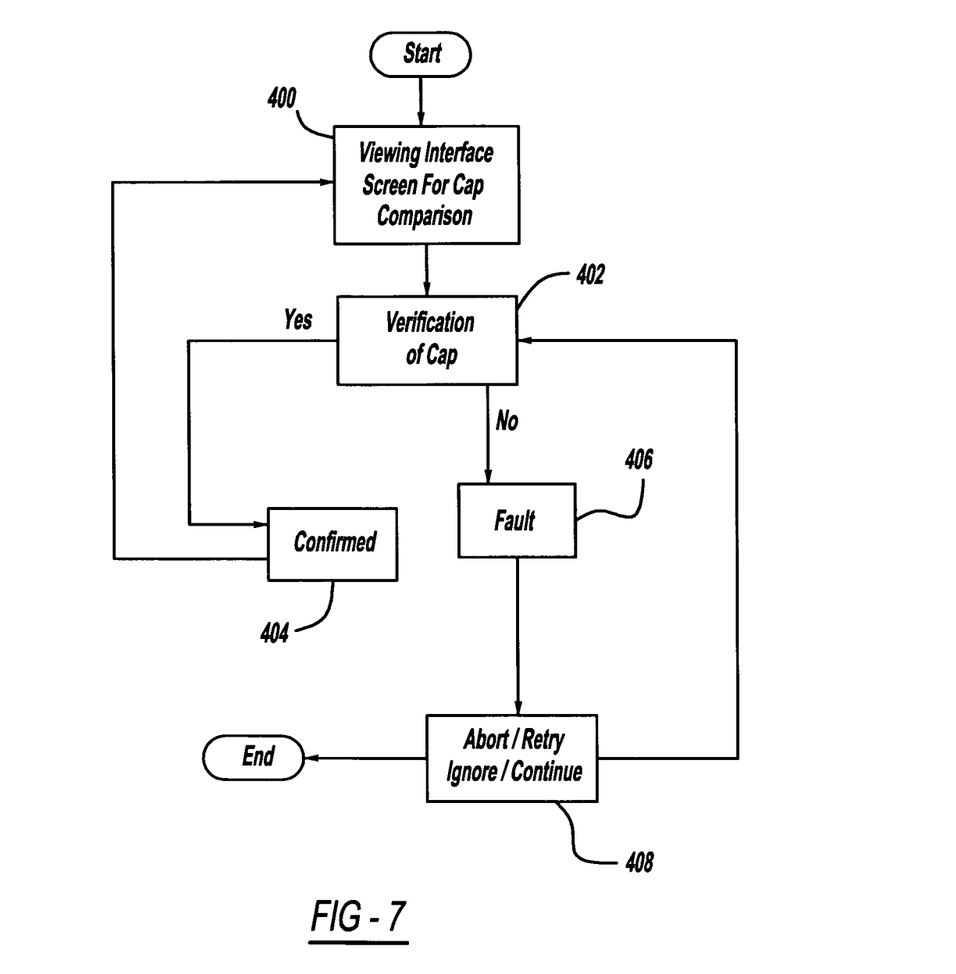
FIG. 7 is a flow chart of a fourth preferred method for verification of cap replaced of the weld cap of the present invention.

Verification of Cap Replaced—FIGS. 3i and 3j are illustrative of some of the preferred profiles of a weld cap and tip measurements used to determine the threshold measurements for comparison during this process. As set forth in FIGS. 4-5 flow charts there is included a diagram illustrating an exemplary method of operation of the cap replaced verification. FIG. 7 is a flow chart diagram illustrating an exemplary method of cap replacement verification. At step 400, the visual interface screen 22 provides an image of the current cap for comparing the threshold measurements to the definable threshold of new cap configuration. The methods described above include the step of verifying cap replacement. Verification of cap replacement may also be used at step 402 to confirm before steps such as: servo gun auto tuning, remastering, tip wear reset, and programming register reset. If verification is confirmed, at step 404 a confirmation is made. If verification is not confirmed, at step 406 a FAULT command issues. At step 408, a choice can be made to Abort/Retry Cap Change/Ignore and Continue cap Change. As with all methods, the user's choice is posted and logged.

Figure 3K:
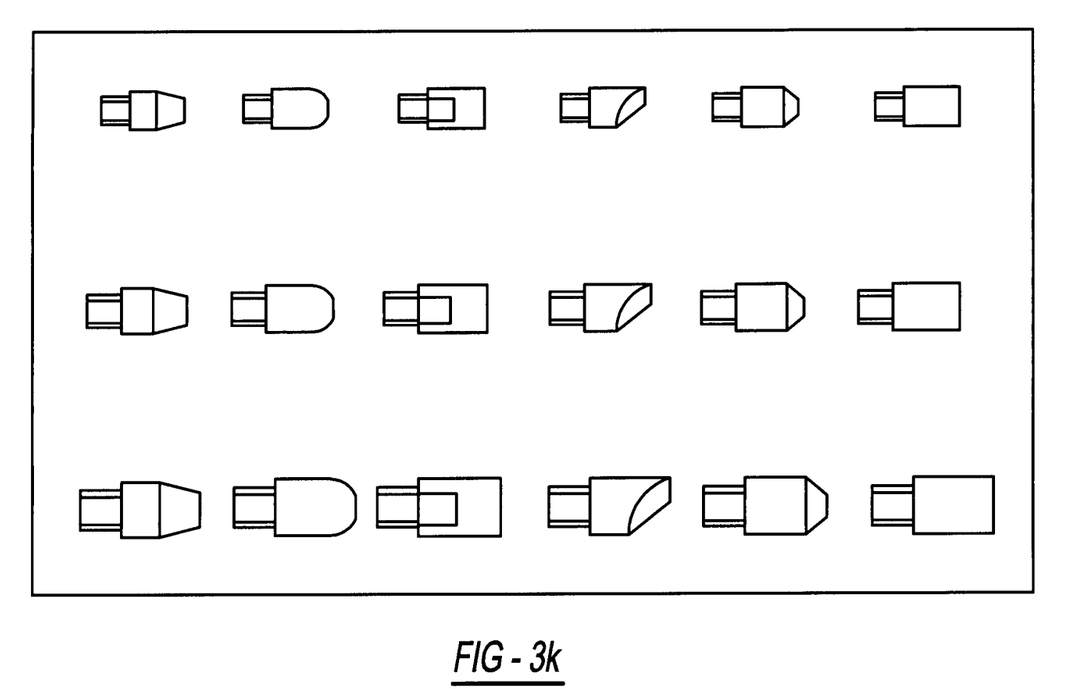
Figure 8:
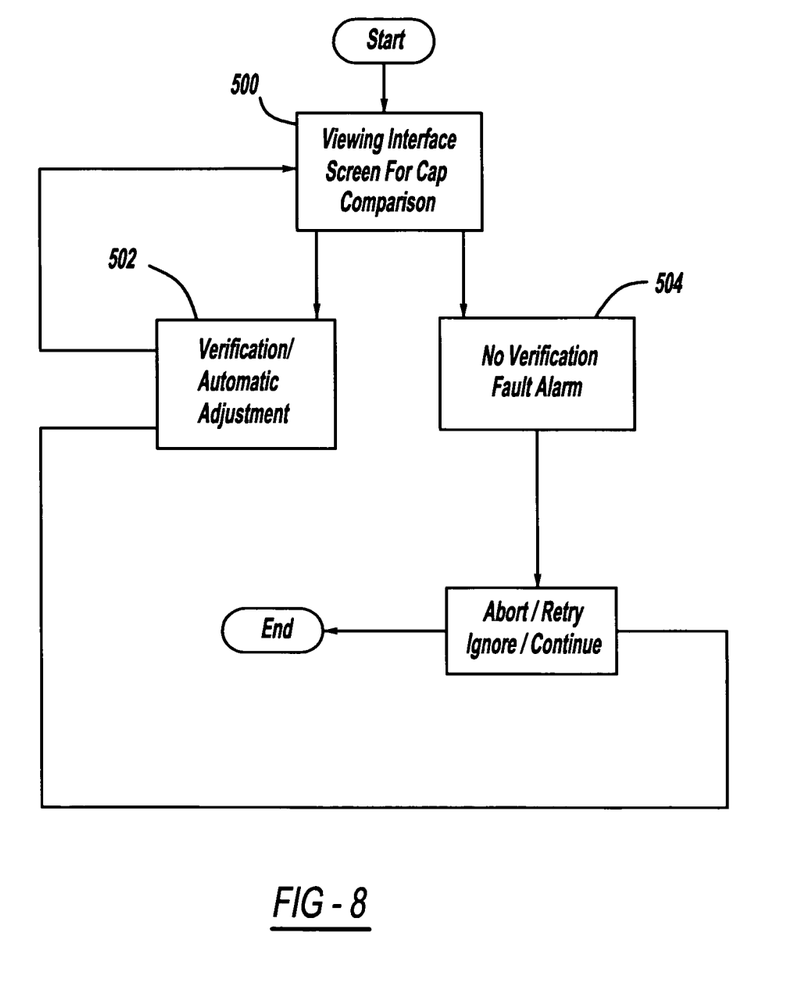
FIG. 8 is a flow chart of a fifth preferred method for verification of cap type of the weld cap of the present invention.

Verification of Cap Type—FIG. 3k is illustrative of some of the cap charts used for mapping for comparison with various preferred cap types that may be provided with the methods of the present invention. FIG. 8 is a flow chart diagram illustrating an exemplary method of cap type verification. At step 500, the visual interface screen 22 provides an image of the current cap for comparing the threshold measurements to the definable threshold of the preferred cap configuration. This verification is usually performed after the cap change step set forth in the above methods. At step 502, if verification is made, automatic servo gun remaster and TCP adjusts if operator desires. Alternatively, if cap type is not verified, at step 504 a FAULT command issues. At step 506, a choice can be made to Abort/Retry New Cap/Ignore and Continue cap type verification. As with all methods, the user's choice is posted and logged.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for assessing characteristics of a weld cap comprising:
    a welding robot including at least one weld cap with a weld cap tip;
    a machine vision sensor generating image data representing said at least one weld cap tip; and
    a control pendant having a visual screen configured to simultaneously display said at least one weld cap in response to the image data and a form of visual measurement for visually comparing said at least one weld cap to weld cap threshold measurement data, said control pendant in communication with a control system having a processor and a data storage, said control pendant being separate from and connected to a robot controller of the welding robot to permit an operator to operate the welding robot and teach the robot controller operation programs, said data storage storing the weld cap threshold measurement data representing a definable threshold of at least one predetermined characteristic of said at least one weld cap, said control system performing an assessment of the at least one predetermined characteristic of said at least one weld cap by comparing the image data with the weld cap threshold measurement data stored in said data storage, and said control system generating an alarm when the definable threshold is exceeded.

2. The apparatus of claim 1 wherein the at least one predetermined characteristic of said at least one weld cap is one of a weld cap tip face measurement, a weld cap tip wear measurement, and a weld cap tip alignment measurement.

3. A method for measuring a weld cap tip characteristic of a weld cap in a welding system including a welding robot having the weld cap with a weld cap tip, a machine vision sensor and a control pendant including a visual screen, said control pendant in communication with a control system having a processor and a data storage, said control pendant being separate from and connected to a robot controller of the welding robot to permit an operator to operate the welding robot and teach the robot controller operation programs, the method comprising the steps of:
    a. providing threshold measurement data representing a definable threshold of a predetermined characteristic of the weld cap tip;
    b. storing the threshold measurement data from the machine vision sensor in the data storage;
    c. generating from the machine vision sensor image data representing the weld cap tip;
    d. comparing the image data with the threshold measurement data in the control system;
    e. simultaneously displaying on the visual screen the weld cap tip from the image data, the definable threshold from the threshold measurement data, and a form of visual measurement for visually comparing the weld cap tip to the threshold measurement data; and
    f. using the control system to generate an indication of a status of the weld cap tip based upon performing said step d.

4. The method of claim 3 wherein the weld cap tip characteristic is tip face and further comprising a step of determining with the control system when the weld cap tip on the welding robot needs to be dressed.

5. The method of claim 4 and further comprising steps of generating from the control system a request to dress the weld cap tip, and dressing the weld cap tip.

6. The method of claim 5 and further comprising a step of verifying with the control system that the weld cap tip has been dressed.

7. The method of claim 4 and further comprising a step of verifying with the control system that the weld cap tip has been dressed.

8. The method of claim 4 and further comprising steps of the control system indicating that the weld cap needs to be changed, and verifying that the weld cap has been changed.

9. A method for measuring alignment of a weld cap tip for aligning the weld cap tip in a welding system including a welding robot having a weld cap with the weld cap tip, a machine vision sensor and a control pendant including a visual screen, said control pendant in communication with a control system having a processor and a data storage, said control pendant being separate from and connected to a robot controller of the welding robot to permit an operator to operate the welding robot and teach the robot controller operation programs, the method comprising the steps of:
    a. providing threshold measurement data representing a definable threshold of weld cap tip alignment;
    b. storing the threshold measurement data in the data storage;
    c. generating from the machine vision sensor image data representing the weld cap tip;
    d. comparing the image data with the threshold measurement data in the control system;
    e. simultaneously displaying on the visual screen the weld cap tip from the image data, the definable threshold from the threshold measurement data, and a form of visual measurement for visually comparing the weld cap tip to the threshold measurement data; and f. using the control system to determine when the weld cap tip needs aligning based upon performing the step d.

10. The method of claim 9 and further comprising a step of aligning the weld cap tip with a servo gun.

11. The method of claim 9 and further comprising steps of generating a request to align the weld cap tip with the control system, and aligning the weld cap tip.

12. The method of claim 11 and further comprising a step of verifying by the control system that the weld cap tip has been aligned.

13. The method of claim 9 and further comprising steps of the control system indicating that the weld cap needs to be changed, and verifying that the weld cap has been changed.

14. A method for measuring tip wear of a weld cap in a welding system including a welding robot having the weld cap with a weld cap tip, a machine vision sensor and a control pendant, said control pendant in communication with a control system having a processor and a data storage, said control pendant being separate from and connected to a robot controller of the welding robot to permit an operator to operate the welding robot and teach the robot controller operation programs, the method comprising the steps of:
   a. providing threshold measurement data representing a definable threshold of wear of the weld cap tip;
   b. storing the threshold measurement data in the data storage;
   c. generating from the machine vision sensor image data representing the weld cap tip;
   d. comparing the image data with the stored threshold measurement data in the control system;
   e. simultaneously displaying on the visual screen the weld cap tip from the image data, the definable threshold from the threshold measurement data, and a form of visual measurement for visually comparing the weld cap tip to the threshold measurement data;
   f. using the control system to generate an indication of a status of the weld cap tip based upon performing said step d.; and
   g. determining with the control system when the weld cap needs to be changed based upon the status indication.

15. The method of claim 14 and further comprising a step of aligning the weld cap with a servo gun.

16. The method of claim 14 and further comprising steps of generating a request to align the weld cap from the control system, and aligning the weld cap.

17. The method of claim 16 and further comprising a step of verifying with the control system that the weld cap has been aligned.

18. The method of claim 14 and further comprising steps of the control system indicating that the weld cap needs to be changed, and verifying that the weld cap has been changed.

19. A method for verifying replacement of a weld cap in a welding system including a welding robot having the weld cap, a machine vision sensor and a control pendant, said control pendant in communication with a control system having a processor and a data storage, said control pendant being separate from and connected to a robot controller of the welding robot to permit an operator to operate the welding robot and teach the robot controller operation programs, the method comprising the steps of:
   a. providing threshold measurement data representing a definable threshold of a profile of the weld cap;
   b. storing the threshold measurement data in the data storage;
   c. generating from the machine vision sensor image data representing the weld cap;
   d. comparing the image data with the stored threshold measurement data in the control system;
   e. simultaneously displaying on the visual screen the weld cap from the image data, the definable threshold from the threshold measurement data, and a form of visual measurement for visually comparing the weld cap to the threshold measurement data;
   f. using the control system to generate an indication of a status of the weld cap based upon performing said step d.; and
   g. determining when the weld cap has been replaced based upon performing said step d.

20. The method of claim 19 and further comprising steps of verifying with the control system the status of the weld cap from at least one of: measuring an alignment of a weld cap tip of the weld cap; measuring a face of the weld cap face for dressing the weld cap tip; and measuring a wear of the weld cap tip for replacement.

21. The method of claim 19 and further comprising steps of generating a request to replace the weld cap from the control system, and replacing the weld cap.

22. The method of claim 19 and further comprising a step of verifying with the control system that the weld cap has been replaced.

23. A method for verifying a type of weld cap in a welding system including a welding robot having a weld cap, a machine vision sensor and a control pendant, said control pendant in communication with a control system having a processor and a data storage, said control pendant being separate from and connected to a robot controller of the welding robot to permit an operator to operate the welding robot and teach the robot controller operation programs, the method comprising the steps of:
   a. providing threshold measurement data representing a definable threshold of a profile of a preferred weld cap;
   b. storing the threshold measurement data in the data storage;
   c. generating from the machine vision sensor image data representing the weld cap;
   d. comparing the image data with the stored threshold measurement data in the control system;
   e. simultaneously displaying on the visual screen the weld cap from the image data, the definable threshold from the threshold measurement data, and a form of visual measurement for visually comparing the weld cap to the threshold measurement data;
   f. using the control system to generate an indication of a status of the weld cap based upon performing said step d.; and
   g. determining whether the weld cap is the preferred weld cap.

24. The method of claim 23 and further comprising a step of, when the at least one weld cap is determined to be preferred weld cap, adjusting an alignment of a weld cap tip of the weld cap.

25. The method of claim 23 and further comprising steps of generating from the control system a request to replace the weld cap, and replacing the weld cap.

* * * * *